April 8, 1941.   P. HOSSMANN   2,237,935
SLIDING CLASP FASTENER
Filed March 17, 1939   2 Sheets-Sheet 2
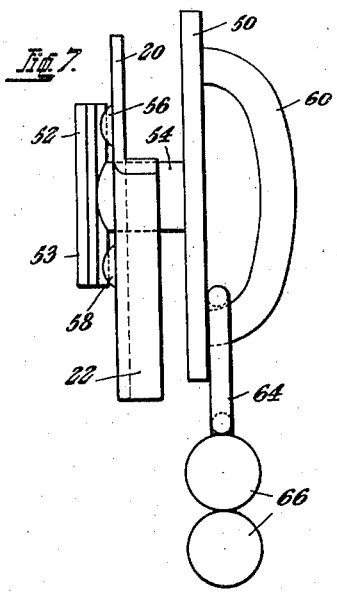
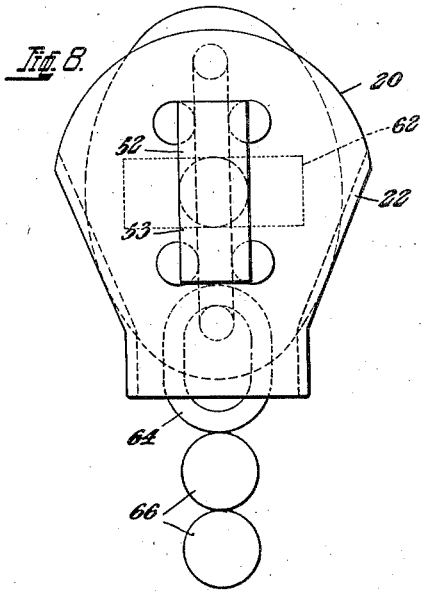
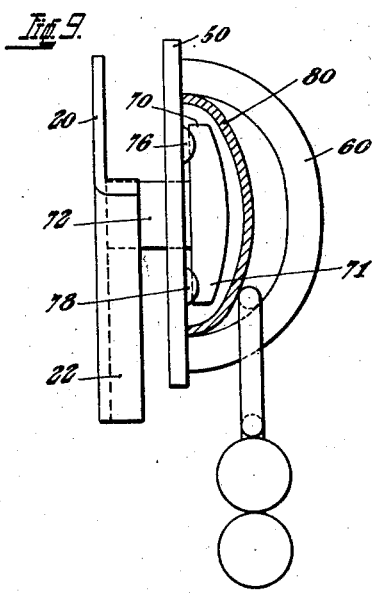
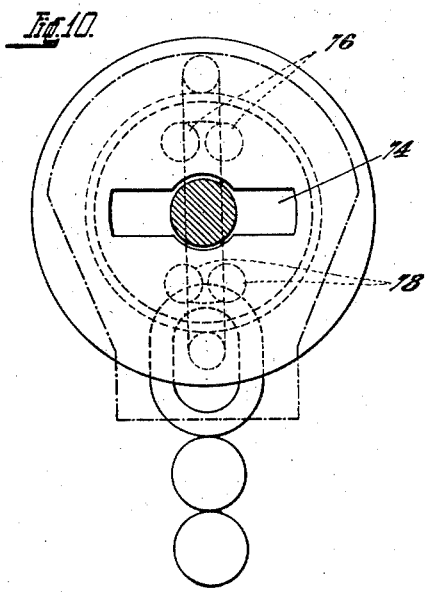
Paul Hossmann
INVENTOR
BY
his ATTORNEY Patented Apr. 8, 1941

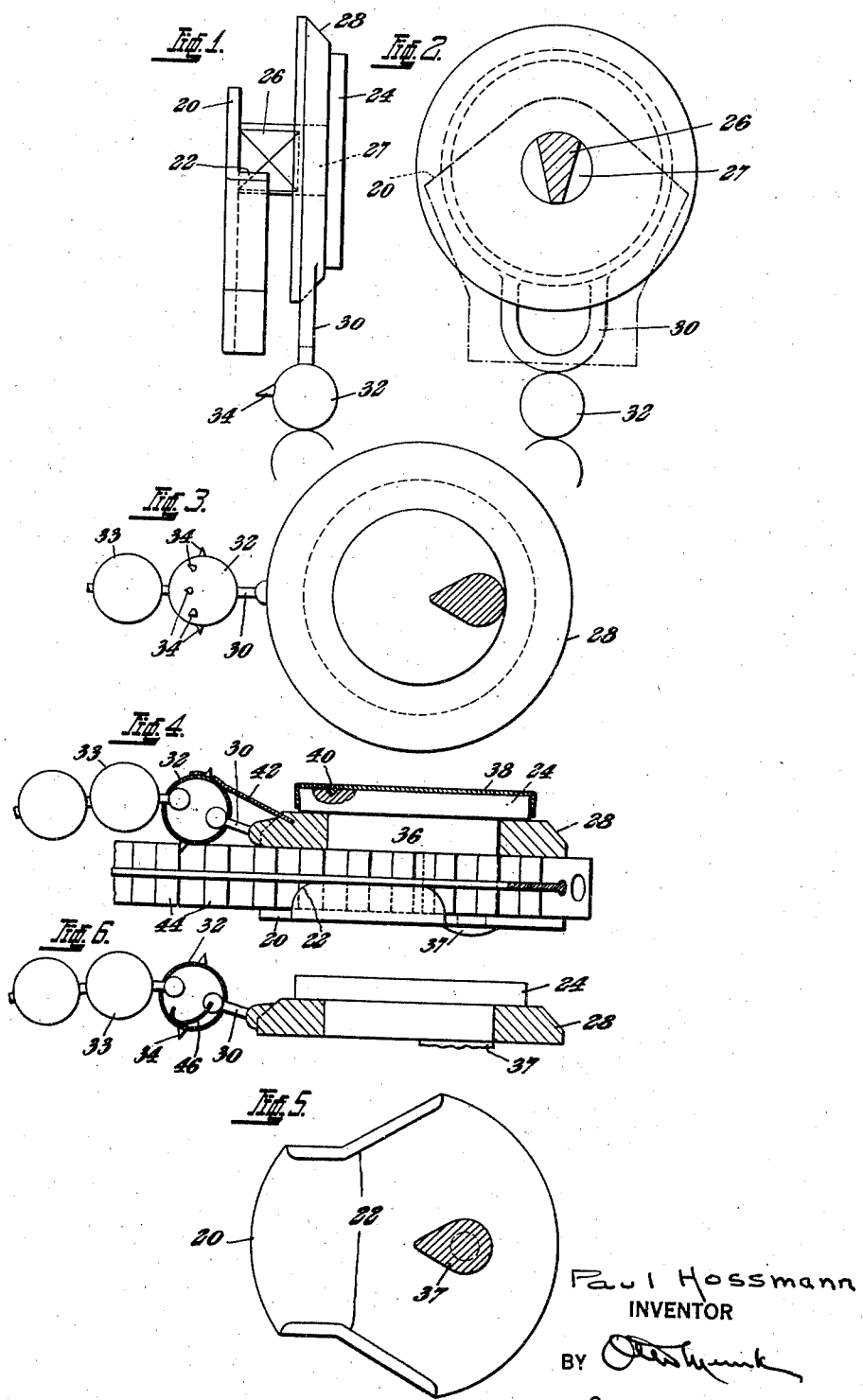

2,237,935

UNITED STATES PATENT OFFICE 2,237,935

SLIDING CLASP FASTENER

Paul Hossmann, Bern, Switzerland

Application March 17, 1939, Serial No. 262,338
In Switzerland July 15, 1938

5 Claims. (Cl. 24—205.5)

This invention relates to sliding members of fasteners of the sliding clasp type.

It has already been proposed to make the sliding members of sliding clasp fasteners in two parts, in such a manner that one part thereof can be detached from the other, but not from the fastener itself. It is essential to this construction that guides for the prongs of the sliding clasp fastener be provided both on the upper and on the lower slide plate, and the whole arrangement is provided merely for the purpose of facilitating complete separation of the sliding clasp fastener.

It has also been proposed to omit the guides for the prongs of the sliding clasp fastener on the upper slide plate, in the case of indivisible sliding members, and to provide the prongs of the sliding clasp fastener with recesses or cavities in which correspondingly shaped guides of the lower slide plate have to engage. On account of the complicated formation of the fastener prongs, this arrangement is not only expensive, but is also liable to get out of order by use.

Moreover, existing sliding clasp fasteners, and in particular their sliding members, have the disadvantage that they have far too much the appearance of a mechanical device which has been very detrimental to their use, particularly for toilet purposes.

In the sliding member according to the present invention, only one sliding plate, preferably the lower one, possesses lateral guides for the fastener members, while the other plate has no lateral guides, but guides the fastener members axially. At least one part of this other slide plate may be rotatably mounted.

The construction may be such that the slide plate that possesses no lateral guides for the fastener member is rotatable, as a whole, relatively to the other slide plate and also detachable and exchangeable, or the slide plate having no lateral guides may be firmly united to the other plate, and be furnished with a rotatable and preferably annular, portion carrying the pulling member. In both cases the slide plate possessing no lateral guides may be made so decorative that the entire sliding member no longer gives the impression of a mechanical device, but is of an ornamental character.

Several embodiments of the invention are illustrated, by way of example, in the accompanying drawings, wherein:

Fig. 1 is a side view of one embodiment of the invention with centrally arranged pin;

Fig. 2 is a bottom view, partly in section, of the upper slide plate of the device shown in Fig. 1;

Figure 3 is an under-plan view, partly in section, showing the upper slide plate with excentrically arranged pin, Figure 4 is a longitudinal section of the complete sliding member, and Figure 5 a top plan view of the lower slide plate of the embodiment shown in Fig. 3, Figure 6 shows a modified construction of the locking member on the upper slide plate;

Figures 7 and 8 show side and bottom views, respectively, of a second embodiment; and Figures 9 and 10 show respectively a side view, partly in section, and a view from below of a third embodiment.

Like reference characters designate like parts throughout the several views.

Referring first to Figures 1 and 2, a slider or sliding clasp of a fastener of the sliding clasp type comprises a lower slide plate 20 having lateral guides 22, and an upper slide plate 24. These two plates are firmly united by a pin 26, 27, whereof a part 26 adjacent the lower plate is of wedge-shape in cross-section, and a part 27, adjacent the upper plate, is of circular cross-section, so that the pin acts as a wedge for the sliding clasp. In order to guide the fastener members axially, the upper slide plate 24 carries a ring 28 which is rotatably mounted on the pin 26, 27, to which ring a pulling member 30 is fastened. This formation of the sliding clasp has the advantage that, in any position of the sliding clasp on the sliding clasp fastener, the ring 28 can be turned by means of the pulling member 30, without difficulty, into the position which permits the sliding clasp to move onwards on the fastener when the member 30 is pulled. Moreover, as can be readily perceived, it is particularly easy in this form of construction to make the portion 24 of the upper slide plate above the ring 28 decorative. In the construction shown in Figure 1, there is also provided on the first link 32 of the pulling member 30 a pointed projection 34 which is adapted to engage in the closure members of the sliding clasp fastener and thus to hold the sliding clasp firm in any desired position relatively to the fastener. To this end, the link 32 of the pulling member may be acted on by a spring, not shown, which tends to hold the projection 34 in engagement between the fastener members. Each time that the pulling member 30 is then gripped to slide the sliding clasp, the projection 34 is brought out of engagement with the fastener members against the action of this spring, as will be understood with reference to the following description of Figures 3 to 5.

In the embodiment illustrated in Figures 3 to 5, the upper slide plate 20 also carries a rotatable ring 28 which, however, is not mounted concentrically, as in the preceding embodiment, but eccentrically with respect to a pin 36, 37 which unites the fixed part 24 of the upper slide plate with the lower slide plate 20 and also acts at the same time as a wedge for the sliding clasp. On the fixed part 24 of the upper slide plate is also mounted a cap 38, which may be mounted either rigidly or detachably, for example similar to a press fastener, on the part 24. This cap 38 may, for example, be made of a precious metal or of a coloured material, such as synthetic resin. It may, moreover, be furnished with the most diverse decorations, such as stones or metal ornaments. In the event of the cap 38 being disposed on the part 24 in such a manner as to be detachable and exchangeable, means are provided for preventing the cap from turning on the part 24. As indicated in Figure 4, the cap may to this end be provided with a shallow depression 40 engaging in a corresponding dimple in the part 24, thus preventing unintentional turning of the cap 38 on the part 24. The pulling member 30, comprising spherical links 32, 33, is mounted on the ring 28. As can be seen from Figure 3, the first link 32 of the pulling member is furnished with a row of pointed projections 34 which, as in the construction described above with reference to Figures 1 and 2, act as catches to secure the sliding clasp in any position relatively to the rows of fastener prongs. The first link 32 is to this end under the action of a spring 42 secured to the ring 28 and tending to hold the link 32 in a position in which the projections 34 are held in engagement with the fastener prongs 44. As soon as the pulling member is seized in order to operate the sliding clasp, the projections 34 disengage from the fastener prongs against the action of the spring 42.

In the alternative construction shown in Figure 6, a spring 46, acting on the link 32 of the pulling member 30, is mounted inside the link 32 which is in the form of a hollow sphere.

As can be seen from the drawings, the pulling member is mounted in the most favourable position in the two examples described above with reference to Figures 3 to 5 and Figure 6, inasmuch as it is practically impossible to tilt the sliding clasp while it is being operated. This obviates a disadvantage possessed by all sliding members constituting clasp heretofore known.

Automatic securing could also be provided for in the other embodiments described hereinafter.

Referring now to Figures 7 and 8, the sliding clasp comprises a lower slide plate 20 with the lateral guides 22, and an upper slide plate 50, whereof the bottom face acts as an axial guide for the fastener members and carries an anchor 52, 53, 54 with two arms 52, 53, the shaft 54 of which projects through a hole in the lower slide plate 20, which is provided on its lower side with two pairs of raised portions 56 and 58, one pair on either side of said hole. The arms 52, 53 of the anchor are approximately rectangular in cross-section, and, in the position shown in the drawings, lie between the raised portions 56 and 58. If the upper slide plate 50 be now turned, by means of a loop 60 fastened thereto, through an angle of 90°, the arms of the anchor are first brought out of engagement with the raised portions 56, 58, and can enter into a recess 62 in the under face of the lower slide plate, as indicated in broken lines in Figure 8. The two slide plates can then be parted to a slight extent, and the sliding clasp is able to slide over any obstruction present in the fastener. An oblong link 64 of a pulling member comprising spherical links 66 used to operate the sliding clasp is attached to the loop 60. The said recess 62 may also be omitted.

All the embodiments hereinbefore described are workable only owing to the fact that the lateral guides are omitted in one slide plate, while at the same time this slide plate nevertheless provides axial guiding for the prongs of the sliding clasp fastener. In hitherto known slide plates having no lateral guiding, this axial guiding is not provided. In the case of the herein described improved sliding clasp, according to the present invention, the prongs of the sliding clasp fastener may therefore be of the customary shapes. Hitherto known sliding clasps having an upper slide plate without lateral guidance, on the other hand, require special shapes for the sliding clasp fastener prongs, because the upper slide plate does not also act as an axial guide for the fastener prongs.

While I have shown and described particular embodiments of my invention, it will be obvious to those skilled in the art that changes and modifications may be made without departing from my invention, and I, therefore, aim in the appended claims to cover all such changes and modifications as fall within the true spirit and scope of my invention.

I claim:

1. A sliding clasp for opening and closing the fastener prongs of a slide fastener, comprising a first and second slide plate disposed in spaced relation to each other and one above the other, means connecting said two slide plates together, the latter being adapted to receive the fastener prongs therebetween, said first slide plate possessing lateral guides for guiding the fastener prongs parallel to the slide plates and said second slide plate serving to guide fastener prongs perpendicularly to said slide plates, a part of said second slide plate being mounted rotatably relative to said first slide plate, said rotatable part of the second slide plate being in the form of a ring, the exterior diameter of said ring being at least equal to the length of the second slide plate, and a pulling member attached to said ring, whereby said pulling member, when operated, acts on the most favorable point of the sliding member, preventing tilting thereof.

2. A sliding clasp as claimed in claim 1, in which said connecting means consists of a pin, the latter forming the sliding member wedge, and said pin being disposed concentrically to said ring.

3. Sliding clasp as claimed in claim 1, in which said connecting means consists of a pin, the latter forming the sliding member wedge, and in which said pin is disposed eccentrically with respect to said ring.

4. Sliding clasp as claimed in claim 1, in which a decorative cap is exchangeably mounted on the stationary part of the second slide plate.

5. Sliding clasp as claimed in claim 1, comprising an automatic locking device for securing the clasp in any desired position relatively to the sliding clasp fastener, said locking device comprising means operatively connected to said clasp for engaging the fastener prongs, said means being adapted to be automatically brought out of engagement with the fastener prongs each time the sliding clasp is operated.

PAUL HOSSMANN.